(12) United States Patent
Hennessy et al.

(10) Patent No.: US 12,118,870 B2
(45) Date of Patent: Oct. 15, 2024

(54) METHODS AND SYSTEMS FOR USING VIDEO SURVEILLANCE TO DETECT FALLING LIQUIDS

(71) Applicant: Tyco Fire & Security GmbH, Neuhausen am Rheinfall (CH)

(72) Inventors: Ronan Hennessy, Cork (IE); Róisín O'Brien, Glanmire (IE); Matthew Breed Myung-Sun Scott, Cork Cork (IE)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/570,236

(22) Filed: Jan. 6, 2022

(65) Prior Publication Data
US 2023/0215265 A1 Jul. 6, 2023

(51) Int. Cl.
*G08B 21/20* (2006.01)
*G06T 7/20* (2017.01)
*G06V 20/40* (2022.01)
*G06V 20/52* (2022.01)
*H04N 7/18* (2006.01)

(52) U.S. Cl.
CPC ............... *G08B 21/20* (2013.01); *G06T 7/20* (2013.01); *G06V 20/44* (2022.01); *G06V 20/52* (2022.01); *H04N 7/18* (2013.01); *G06T 2200/24* (2013.01); *G06T 2207/10016* (2013.01); *G06T 2207/30232* (2013.01)

(58) Field of Classification Search
None
See application file for complete search history.

(56) References Cited

U.S. PATENT DOCUMENTS

| 2013/0063588 A1* | 3/2013 | Nemani | G01M 3/04 |
| | | | 348/125 |
| 2014/0320666 A1* | 10/2014 | Badawy | H04N 7/18 |
| | | | 348/169 |
| 2017/0355081 A1* | 12/2017 | Fisher | G08B 21/20 |

FOREIGN PATENT DOCUMENTS

| JP | 2019184462 A * 10/2019 | G01M 3/38 |

OTHER PUBLICATIONS

International Search Report issued in corresponding in International Application No. PCT/US2023/060049 dated May 3, 2023.

* cited by examiner

*Primary Examiner* — Heather R Jones
(74) *Attorney, Agent, or Firm* — ArentFox Schiff LLP

(57) ABSTRACT

Apparatus and methods for automatically detecting falling fluid include receiving one or more live video feeds from one or more cameras. The live video feeds are received concurrently. The live video feeds are analyzed to detect a fluid leak using a motion algorithm. False positives are reduced and sensitivity for the fluid leak detection is improved using information from one or more integrated systems, in response to detecting the fluid leak. A notification is generated to inform a user of the detected fluid leak, in response to detecting the fluid leak after reducing the false positives.

20 Claims, 7 Drawing Sheets

METHODS AND SYSTEMS FOR USING VIDEO SURVEILLANCE TO DETECT FALLING LIQUIDS

TECHNICAL FIELD

The present disclosure generally relates to video surveillance systems, and more specifically, to methods and systems for using video surveillance to detect falling liquids.

BACKGROUND

Video Surveillance system may be used to detect events of interest in video feeds in real-time or offline (e.g., by reviewing previously recorded and stored video). Typically this task is accomplished by detecting and tracking targets of interest. For example, video surveillance systems may assist in: capturing a thief at a retail location, detecting an emergency situation (e.g., fire), and the like. Generally, building owners and occupants are interested in receiving notifications about water leaks in buildings. Wasting water has enormous practical, financial, and environmental consequences. Undetected leaks in plumbing fixtures are one of the most insidious sources of wasted water. Beyond mere wastage a leak can be a harbinger of a larger problem that may require a larger repair effort and possibly cause more damage if it is not caught early enough.

When water leaks are not detected quickly, resultant destruction to building components can cost many times the amount of money repairing these leaks would cost if detected early. As a common example, a leak in a roof can, over time, cause rot in the roof deck, rafters, joists, framing, ceilings and soffits. Plumbing leaks also commonly cause similar expensive-to-repair damage to walls, ceilings, studs and flooring.

Capturing a water leak may be difficult using conventional methodologies. For example, monitoring extensive areas of a data center is prone to human error. The occupants of these data centers may not notice moisture issues until somebody happens to be physically close to the leak, or until the leak causes sufficient damage to produce additional effects, such as damage to an electrical circuit. This damage can be confounded when a leak occurs overnight, when nobody is in the building or the building occupants are asleep.

In view of the foregoing, there is a need to efficiently and securely protect crucial resources from water leaks that may otherwise be at risk.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

Present disclosure provides methods for detecting leaks inside buildings. In addition, the present disclosure provides a system configured to send an alert of the potential water leak condition. If a leak is detected, then an alert/notification may be addressed by an appropriate individual, such as residential property owners, an industrial/commercial owners, and/or a site maintenance personnel.

One example implementation relates to a method for automatically detecting falling fluid. One aspect of the method includes receiving one or more live video feeds from one or more cameras. The live video feeds may be received concurrently. The live video feeds are analyzed to detect a fluid leak using a motion algorithm. False positives are reduced and sensitivity for the fluid leak detection is improved using information from one or more integrated systems, in response to detecting the fluid leak. A notification is generated to inform a user of the detected fluid leak, in response to detecting the fluid leak after reducing the false positives.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

This disclosure relates to leak detection system designed to cooperate with a facility management system. Conventional infra-red cameras are capable of detecting water or damp areas behind a wall. In contrast, in the present disclosure, the leak detection system processes video feeds received from camera(s)/sensing device(s) using computer vision algorithms to monitor various areas for falling droplets of water. In response to falling water being detected, the leak detection system may send a notification. For example, the notification may be sent to notify building management and/or occupants of a potential leak, who can immediately respond and take corrective action. In many cases, such timely corrective actions may reduce or mitigate further damage, or in the case of sensitive equipment, ensure that services are not interrupted.

Figure 1:
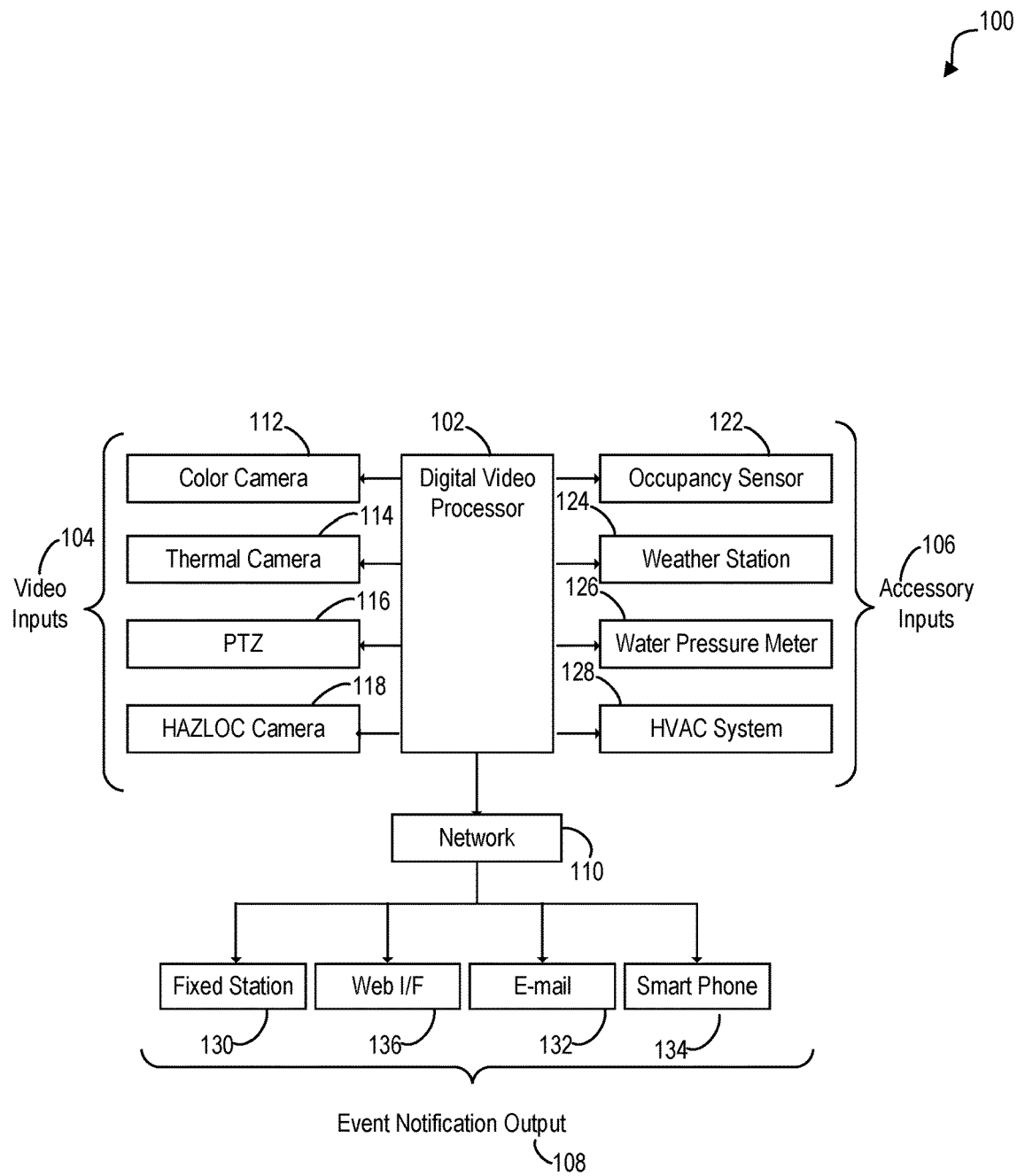
FIG. 1 is an example of a schematic illustrating a leak detection system in accordance with aspects of the present disclosure.

FIG. 1 is an example of a schematic illustrating a leak detection system 100 in accordance with aspects of the present disclosure.

In FIG. 1, the leak detection system 100 may comprise a digital video processor (DVP) 102, one or more video inputs 104 communicatively coupled with the DVP 102, one or more accessory inputs 106 communicatively coupled with the DVP 102, and event notification outputs 108 that may be communicatively coupled directly or indirectly, for example through a network 110 such as the internet, to receive alert messages from the DVP 102. The video inputs 104 may comprise one or more of a color camera 112 such as a day/night video surveillance color camera, a thermal camera 114, pan-tilt-zoom camera 116 such as a conventional security camera, and hazardous location camera 118.

The accessory inputs 106 may comprise one or more of an occupancy sensor 122, weather station 124, water pressure meter 126 and HVAC (Heating Ventilating and Air Conditioning) system 128. The inputs 104 and 106 may be conventional commercially available products. The DVP 102 may comprise a digital video recorder, with built in or added encoder, having digital video processing circuitry or a digital video recorder combined with separate encoder and processor. The DVP 102 may comprise conventional digital video recording and processing hardware, configured with software for carrying out the functions disclosed here to receive frames of video output from one or more of the video inputs 104, detect and track one or more fluid drips in the frames to determine a trajectory for the drips and trigger an alert message if the trajectory of the drips is characteristic of a leak. For example, the DVP 102 may comprise a video edge device.

The cameras 112, 114, 116 and/or 118 may be communicatively coupled via 75 ohm BNC (Bayonet Neill-Concelman) (RG 59U/RG 6) cable or other suitable communication link (including a wireless link) to the DVP 102. An exemplary DVP 102 may be equipped with a H.264 hardware encoder, capable of encoding analog video feed at 30 fps, for example. Baseline profile may be used with a quality settings of 30 and GOV (Group Of Video images) settings of 5. The DVP 102 preferably uses two cameras: one thermal 114 and one color 112. In one aspect, the thermal camera 114 may be configured to run the leak detection algorithm described in conjunction with FIG. 2. The color camera 112 or other cameras 116, 118 may be used for visual reference and verification. The analysis may for example be done on raw frame buffer (YUV) of Common Intermediate Format (CIF) (352×240) resolution at 10 fps. YUV is a color encoding system typically used as part of a color image pipeline. The video may, for example, be recorded in H.264 compressed format of which resolution and frame rate are user selectable. In the exemplary aspect, supported resolutions and frame rates for recorder video are CIF/2CIF/4CIF and 5/10/15/30 fps, respectively, but this will change as standards and available equipment change.

For event notification, in the event of a detected leak, the DVP 102 may be programmed to send the notification to one or more recipients in several ways. The DVP 102 may send the notification to one or more of a central monitoring station 130, email 132 or a handheld smart phone 134 with mobile app. The events can also be viewed through web browser 136 (for example, Chrome) by logging into the DVP 102. The notification contains alert/alarm event message and may include snapshots from the thermal camera 114 and color camera 112 (if equipped) or other camera 116, 118. The DVP 102 may also be programmed to set off a buzzer or siren through a digital IO interface or even send notification to SCADA (Supervisory Control and Data Acquisition) system through RTU (Remote Terminal Unit)/Modbus interface, for example.

Figure 2:
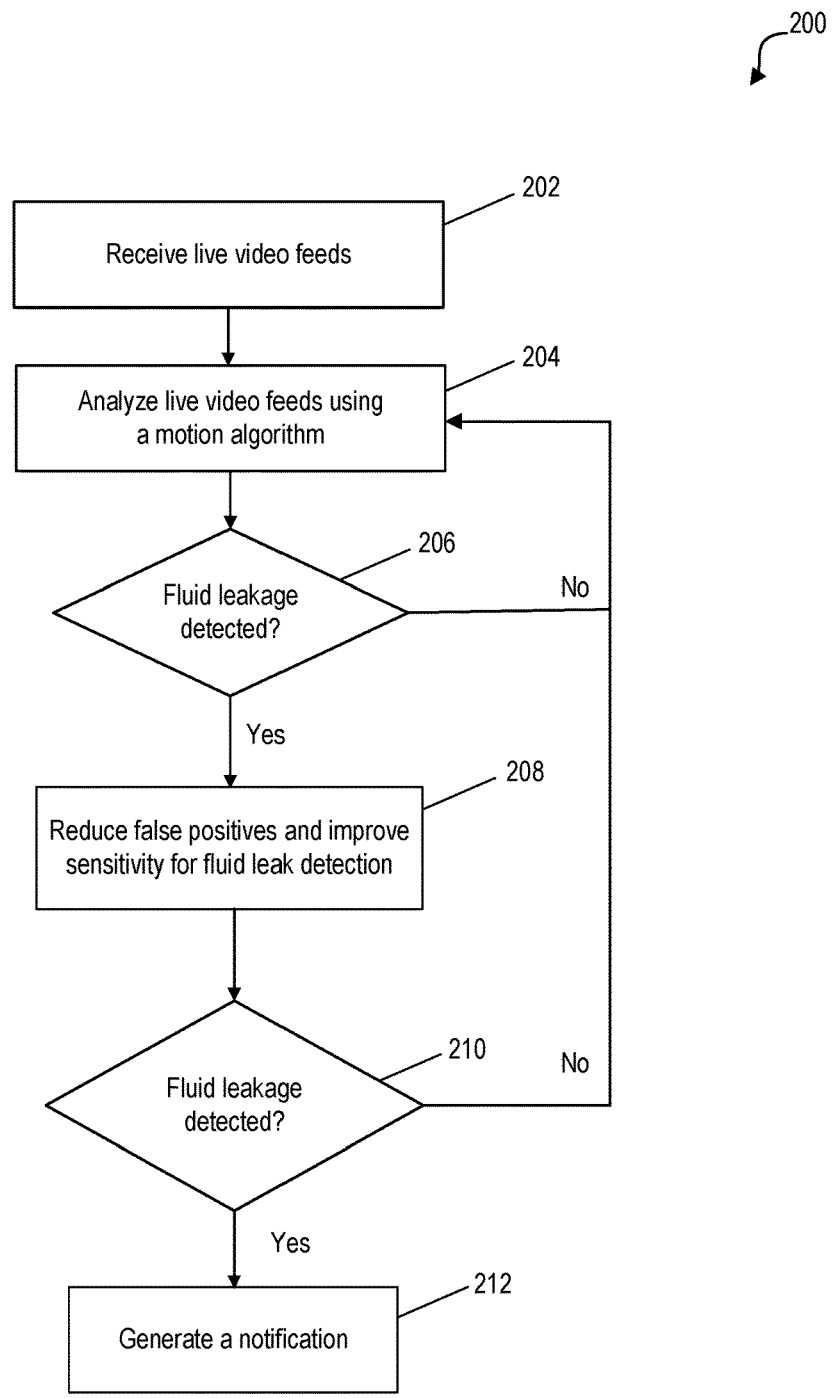
FIG. 2 is an example of a flowchart illustrating a method for automatically detecting falling fluid, in accordance with aspects of the present disclosure.

FIG. 2 is an example of a flowchart illustrating a method 200 for automatically detecting falling fluid, in accordance with aspects of the present disclosure. FIGS. 1 and 3-6 may be referenced in combination with the flowchart of FIG. 2. At step 202, the DVP 102 may receive one or more live video feeds from one or more cameras 112-118. By way of example only, the DVP 102 may be able to or have the capacity to contain approximately 30 seconds of historic video and/or audio data and/or one or more snapshots. Various other aspects may comprise a storage capacity anywhere between 5 seconds to 30 minutes of historic video and/or audio data and/or one or more snapshots, although a variety of other durations might apply under specific circumstances. In an aspect, the live video feeds may be received concurrently. In an aspect, two or more different video feeds may be combined by the DVP 102 for analytical purposes.

At step 204, the DVP 102 may utilize a motion algorithm suitable for analyzing captured images in the one or more live video feeds to detect a fluid leak. In an aspect, the DVP 102 may automatically load the proper motion algorithm based on the leak identification characteristics (event characteristics) that have been identified while analyzing the video feeds. The event characteristics may include, but are not limited to: an object falling vertically down, an object travelling at a velocity corresponding to an object falling under effect of gravity forces, an object repeatedly falling vertically down in the same region of field of view of the one or more cameras, an object falling with substantially constant frequency. In an aspect, the DVP 102 may be configured to measure fluid flow velocity. In an aspect, the optimal range of velocities associated with a leak may be adjusted by the DVP 102 based on the range of distances from the camera to the falling objects that are being monitored. In an aspect, once a repeatedly falling object is detected, the DVP 102 may focus on that particular region of interest within a corresponding field of view.

At step 206, the DVP 102 may determine if fluid leakage is detected using a motion algorithm, for example. In response to detecting the fluid leak (step 206, "yes" branch), the DVP 102 may employ information from one or more integrated systems in order to reduce the possibility of false positives to detect fluid leaks and to improve sensitivity for the fluid leak detection (step 208). The DVP 102 may correlate analyzed image data and the information from one or more integrated systems (e.g., accessory inputs 106) to confirm possible fluid leaks and their locations. A confidence score may be calculated for each potential leak based on the extent to which the potential leak possesses or reflects a certain leak characteristic. In one aspect, the confidence score may be indicative of accuracy of detection of the potential fluid leak. Potential leaks may then be ranked by increasing or decreasing confidence scores. Information from the integrated systems may be used by the DVP 102 to adjust the sensitivity of the system, such as increasing or decreasing the confidence score.

Example of the integrated systems may include, but are not limited to: occupancy sensor 122, weather report generated by the weather station 124, water pressure meter 126, HVAC system 128. In an aspect, the occupancy sensor 122 may be an infrared occupancy sensor. In an aspect, the presence of people in a monitored environment, may make the monitored environment less susceptible to fluid leaks. The movement of people may cause false positives and presence of people in the monitored space may increase the likelihood of detecting and reporting possible leaks by people themselves. In an aspect, the weather report may include weather forecasting information. Conditions such as rainfall or snow followed by warm weather may make the DVP 102 more sensitive to detecting leaks, since fluid leaks might become more likely.

In various aspects, the principles of the present disclosure may be applied to other integrated monitoring systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. Aggregate current readings can be analyzed by the integrated monitoring system to assess operation of the individual components of the aforementioned systems.

In an aspect, the DVP 102 may be configured to receive information from a consumption meter, e.g., a water or heat meter 126, for measuring a flow rate of a fluid. Information about water leaving an integrated water supplying system may make the DVP 102 more sensitive to detecting leaks, particularly if the building being monitored is unoccupied. Although a small leak may not have a noticeable impact on water pressure in a system, a small leak in a room may be an indicator of a larger leak elsewhere in the building.

In an aspect, the DVP 102 may be configured to receive information from various HVAC modules 128. A localized increase in humidity may make the DVP 102 more sensitive to leak detection events, for example.

If no leak is detected (step 206, "no" branch), the DVP 102 may return to step 204.

In an aspect, after reducing the false positives, at step 210, the DVP 102 may determine again if any fluid leakage is detected using a motion algorithm, for example. If the DVP 102 employs a previously trained Artificial Intelligence (AI) system (described below), steps 208 and 210 may be optional. In response to detecting the fluid leak (step 210, "yes" branch), the DVP 102 may generate a notification to inform a user of the detected fluid leak (step 212). In various aspects, notifications may be audible, visual, or both. The notification may also be rendered by different applications 130-134, such as computer applications 132, web-based cloud notifications 136, or smart phone applications 134 (e.g. Android, IOS, etc.). The notification may be sent to a registered user, such as a security guard, a homeowner, a water company, a property management company, an insurance company, and/or a maintenance company. Once notified, appropriate action can be taken to fix the leak, thus mitigating the potential damage and loss should the leak have gone unnoticed for longer periods of time. If no leak is detected (step 210, "no" branch), the DVP 102 may return to step 204.

In one aspect, the DVP 102 may be an edge device. In an aspect, the DVP 102 may autonomously monitor an environment together with other environmental sensors. The DVP 102 may raise an alert only when a fluid leak is detected.

In other words, the method 200 includes a method for automatically detecting falling fluid. One aspect of the method includes receiving one or more live video feeds from one or more cameras. The live video feeds are received concurrently. The live video feeds are analyzed to detect a fluid leak using a motion algorithm. False positives are reduced and sensitivity for the fluid leak detection is improved using information from one or more integrated systems, in response to detecting the fluid leak. A notification is generated to inform a user of the detected fluid leak, in response to detecting the fluid leak after reducing the false positives.

In one or any combination of these aspects, the motion algorithm is configured to detect the fluid leak by identifying one or more event characteristics.

In one or any combination of these aspects, the one or more event characteristics comprise: an object falling vertically down, an object travelling at a velocity corresponding to an object falling under effect of gravity forces, an object repeatedly falling vertically down in the same region of field of view of the one or more cameras, an object falling with substantially constant frequency.

In one or any combination of these aspects, the fluid leak is detected by identifying one or more fluid drips using one or more dense optical flow techniques.

In one or any combination of these aspects, the method further includes generating a confidence score of the detected fluid leak based on the analyzed one or more live video feeds. The confidence score is indicative of accuracy of detection of the detected fluid leak.

In one or any combination of these aspects, the fluid leak is detected using a machine learning model trained using a plurality of video feeds corresponding to one or more types of fluid leaks.

In one or any combination of these aspects, the one or more integrated systems comprise at least one of: occupancy sensor, weather report, water pressure meter, Heating Ventilating and Air Conditioning (HVAC) system.

In one or any combination of these aspects, the method 200 further includes displaying the notification to the user using a Graphical User Interface (GUI).

In one or any combination of these aspects, the GUI includes a user interface element for filtering the received notifications based on one of: geographic location, building, and room.

Figure 3:
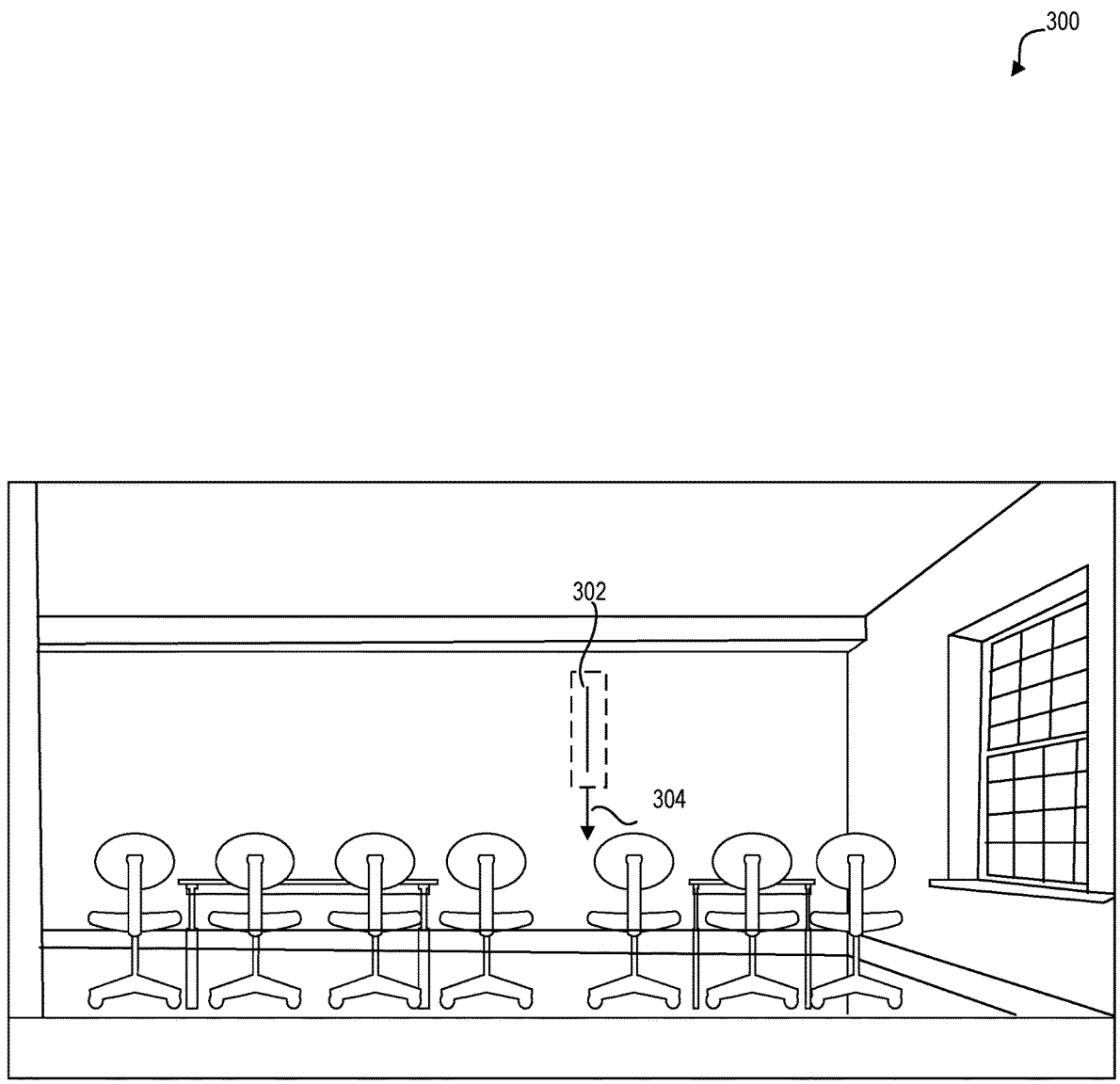
FIG. 3 is an example of a schematic illustrating drip detection, in accordance with aspects of the present disclosure.

FIG. 3 is an example of a schematic illustrating drip detection, in accordance with aspects of the present disclosure. In an aspect, a multi-channel DVP 102 may receive input feeds from various data sources including, for example, feeds from cameras 112-118, monitoring devices and sensors, feeds for environment factors from various sensors (temperature, room traffic), and so on. Video feed 300 shown in FIG. 3 illustrates a drip 302, which may be identified by the DVP 102 by employing one or more dense optical flow techniques, for example. Optical flow techniques are based on the idea that the same physical point on an object in the scene is captured by the camera in corresponding points in the two images preserving certain image properties such as brightness, the gradient vector, etc. These techniques compare sequential frames to identify regions of changing pixels, which signify movement at a certain velocity in a certain direction. In an aspect, the DVP 102 may identify the drip 302 as an area of changing pixels.

This analysis may include kinematic or motion features, such as determining that the drip 302 is constantly moving, but that the motion is restricted to a constrained area, as expected by a drip originating from a leak. Kinematic features can include size constraints of the drip 302, such as a minimal and maximal size through a sequence of images. The assessment of sequential frames may determine a motion vector 304, which may then be evaluated by the DVP 102 against characteristics of a leak. The motion vector 304 of the drip 302 may indicate a spatial displacement of the drip 302 between sequential frames. The DVP 102 may be configured to detect both intermittent drips of water and substantially continuous streams regardless of flow rate.

Figure 4:
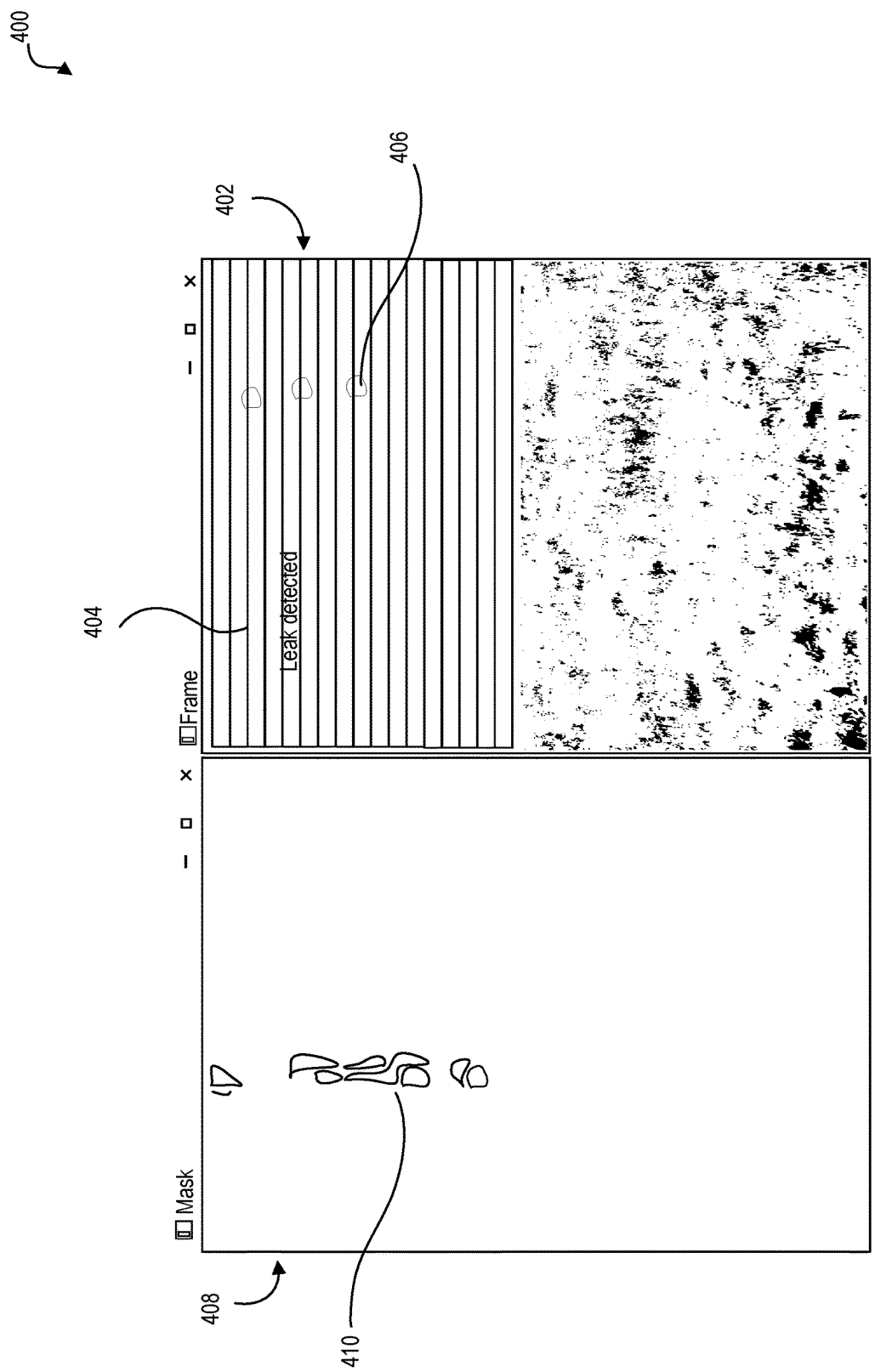
FIG. 4 is an example of a video frame analyzed by a leak detection application, in accordance with aspects of the present disclosure.

FIG. 4 is an example of a video frame analyzed by a leak detection application, in accordance with aspects of the present disclosure. In FIG. 4, a video frame 402 shows an original state of the system when no motion is detected. Accordingly, the video frame 402 may display message 404 as "Waiting". Once the DVP 102 detects the presence of a drip 406 moving down the camera's field of view and in response to confirming a leak, the text of the message 404 may change to indicate leak detection. FIG. 4 also illustrates an example of an analysis frame 408 that shows a heatmap representation of changing pixels. In the heatmap representation, pixels in the analysis frame 408 may be labeled in such a way that pixels sharing the same characteristics (e.g., color, texture, proximity) have the same label. For example, pixels associated with the downward movement can be assigned red color on the heatmap. The analysis frame 408 also highlights the detected drip 410. The resulting analysis frame 408 reflects corresponding video frame 402.

In an alternative aspect, the DVP 102 may employ an Artificial Intelligence (AI) video analysis system (model). Such an AI system may be trained using video feeds of various types of leaks. In some aspects, evolutionary AI approaches may be used. In the context of evolutionary AI approaches, "worker" algorithms may be deployed to train a master algorithm to evolve, and improve, performance of the AI system over time. At each step of the training process, the "worker" algorithms may execute the task-at-hand and report a performance metric to the master algorithm. "Worker" algorithms with a superior metric continue to be used as the basis for further "random mutations," while those with inferior metrics are discontinued. Further enhancements including backpropagation (whereby learning may be accelerated by an improved understanding of the relationship between the input changes and the resulting output changes) may be also incorporated.

In yet another alternative aspect, the DVP 102 may employ an object recognition system to identify objects of interest, such as, but not limited to, sprinklers and pipes. Furthermore, the DVP 102 may create regions of increased sensitivity around the identified objects.

Figure 5:
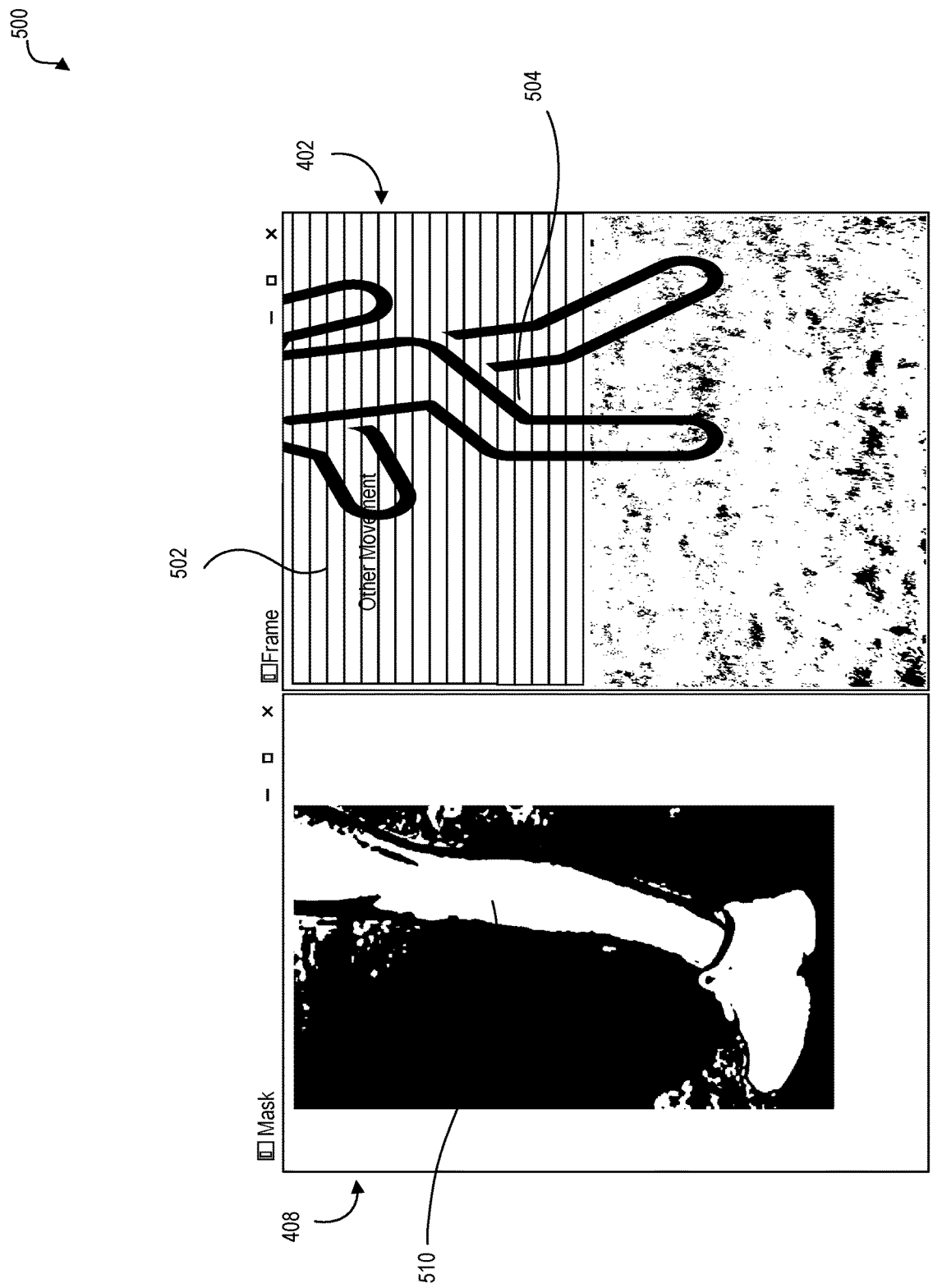
FIG. 5 is an example of another video frame analyzed by the leak detection application, in accordance with aspects of the present disclosure.

FIG. 5 is an example of another video frame analyzed by the leak detection application, in accordance with aspects of the present disclosure. In one non-limiting example, the motion may be detected using longitudinal field of view angle. A video frame 402 shows a person 504 and the text of the message 404 may change again and may display "Other movement", for example, indicating that the characteristics of the detected movement measured by the DVP 102 do not match characteristics of the measured movement of the drip 406. The analysis frame 408 in FIG. 5 shows heatmap 510 of pixel changes that are used for analysis in this case.

Figure 6:
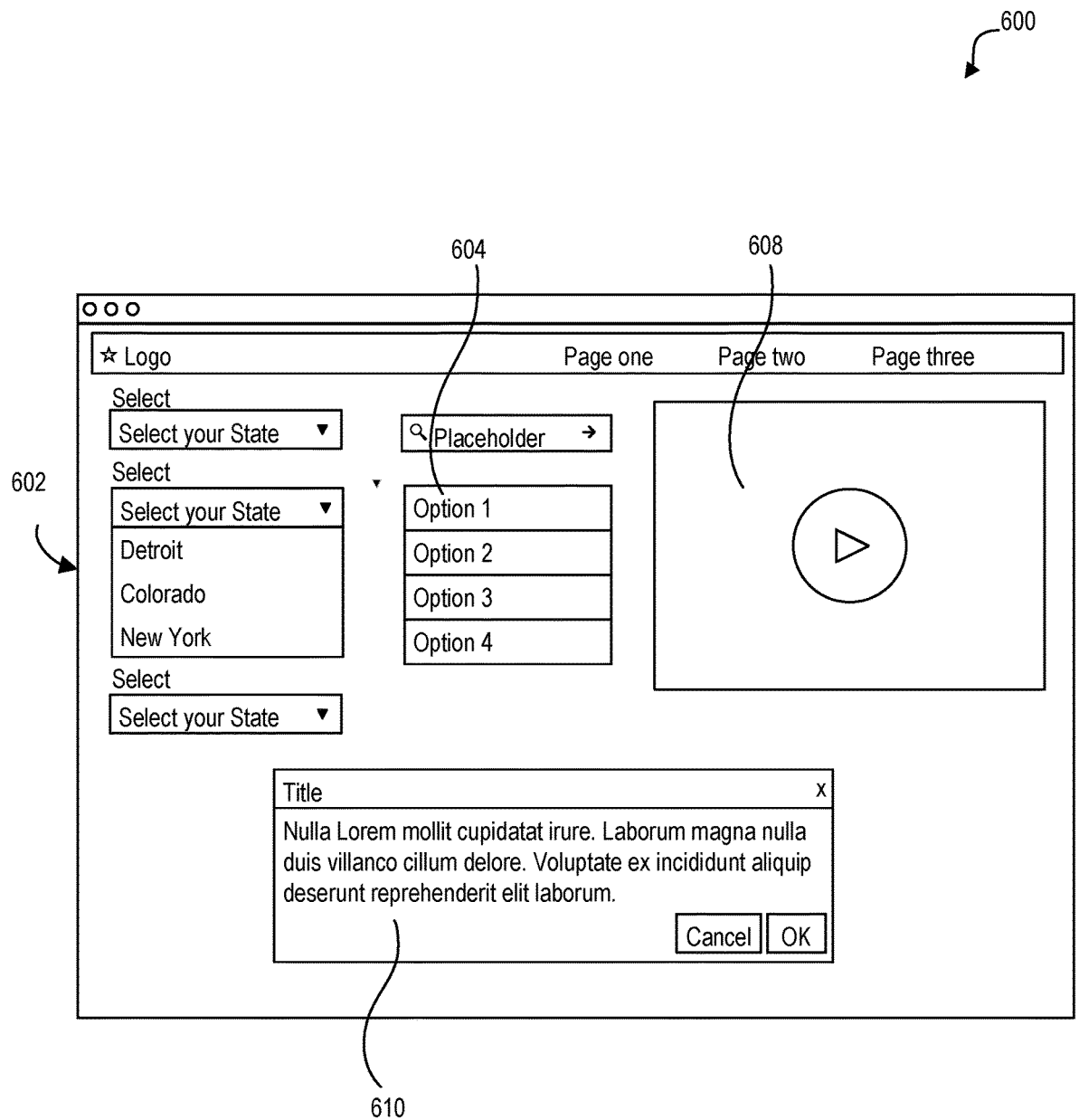
FIG. 6 is an example of a User Interface (UI) of the leak detection application, in accordance with aspects of the present disclosure.

FIG. 6 is an example of a User Interface (UI) of the leak detection application, in accordance with aspects of the present disclosure. The DVP 102 may be configured to communicate one or more notifications that include alerts via one or more communication channels (such as event notification output 108). The UI 600 may display alerts, filters, and/or other information related to detected leaks. Important aspects and advantages of the disclosed system include the ability to filter alerts. FIG. 6 shows an example configuration of the UI 600. The UI 600 may enable the user to configure one or more alert actions based on the filters. For example, the UI 600 may comprise filter settings 602 to enable functionality such as filtering alerts by geographic region, building, or room. The UI 600 may display a list 604 of all alerts that match filter settings 602. The user may select an alert from the list 604 to view live video feed 608 from one or more of the camera's 112-118, based on which the alert was generated. After reviewing the corresponding video feed 608, the user may choose to accept or dismiss the alert 610. In some cases, after receiving an alert based on the live video feed from a particular source, such as one of the cameras 112-118, a user may wish to suppress subsequent perceptual outputs for alerts based on a video feed from the same source, and/or suppress display of notifications representing alerts from the same source. That is, a user may not wish to be notified by a perceptual output if subsequent alerts are received from the same source, and/or may not wish to have the associated notification displayed on the UI 600. In some cases, the user may choose to view a recorded segment or still images corresponding to the timeframe at which one or more drips associated with a potential leak was detected. The user may be able to scroll through the video at a hyper-lapse speed, and then select a portion for a normal time lapse, or normal time view.

If the DVP 102 is configured to employ a trained machine learning model to detect leaks, as discussed above, then the user's acceptance or dismissal of alerts 610 may be used to automatically provide additional training to the trained machine learning model. In various aspects, the DVP 102 may apply the training to a single camera 112-118/video feed 608 to more accurately tailor the detection accuracy to each monitored environment, or may apply across multiple cameras 112-118 in the detection system 100.

In another aspect, if the DVP 102 is configured to use human-configurable rules and pre-defined characteristics, the UI 600, may provide a user an ability to adjust the settings for a particular camera 112-118 by one or more interactions with the UI 600. For example, a user may have an ability to reduce the overall sensitivity, restrict detection of fluid leaks to specific monitored regions, and/or adjust velocity/vector tolerances.

In some aspects, the UI 600 may be configured to automatically trigger a security response action.

Figure 7:
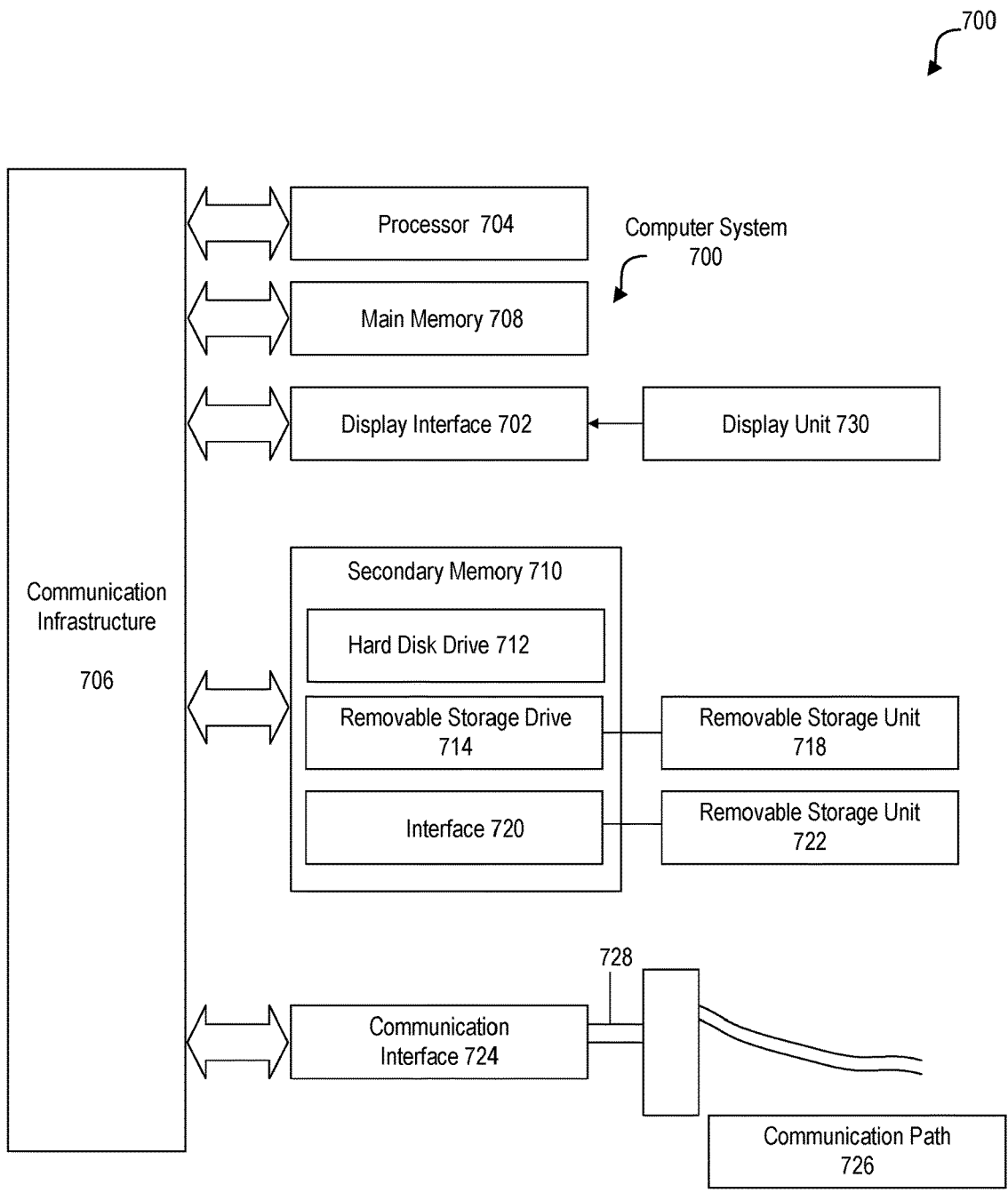
FIG. 7 is an example of a block diagram illustrating various hardware components and other features of the leak detection system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 7 is an example of a block diagram illustrating various hardware components and other features of a computer system that may operate the leak detection system in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 704, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 706, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 700, or any other type of connection between computer-related components described herein can be referred to an operable connection, and can include a connection by which entities are operably connected, such that signals, physical communications, and/or logical communications can be sent and/or received. An operable connection can include a physical interface, a data interface and/or an electrical interface.

Computer system 700 can include a display interface 702 that forwards graphics, text, and other data from the communication infrastructure 706 (or from a frame buffer not shown) for display on a display unit 730. Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 can include other similar devices for allowing computer programs or other instructions to be loaded into computer system 700. Such devices can include, for example, a removable storage unit 722 and an interface 720. Examples of such can include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

It should be understood that a memory, as used herein can include volatile memory and/or non-volatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 700 can also include a communications interface 724. Communications interface 724 allows software and data to be transferred between computer system 700 and external devices. Examples of communications interface 724 can include a modem, a network interface (such as an Ethernet card), a communications port, a Personal Computer Memory Card International Association (PCMCIA) slot and card, etc. Software and data transferred via communications interface 724 are in the form of signals 728, which can be electronic, electromagnetic, optical or other signals capable of being received by communications interface 724. These signals 728 are provided to communications interface 724 via a communications path (e.g., channel) 726. This path 726 carries signals 728 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs can also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software can be stored in a computer program product and loaded into computer system 700 using removable storage drive 714, hard drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for automatically detecting a fluid leak, comprising:
   receiving, by a processor, one or more live video feeds from one or more cameras;
   analyzing, by the processor, the one or more live video feeds to detect the fluid leak in response to identifying a motion of a vertically falling fluid using a motion algorithm, wherein the motion comprises the motion of one or more objects travelling at a velocity corresponding to falling under effect of gravity forces, repeatedly falling vertically downward in a same region of a field of view of the one or more cameras, and/or falling with a substantially constant frequency; and
   generating a notification, by the processor, to inform a user of the fluid leak, in response to detecting the fluid leak.

2. The method of claim 1, further comprising, in response to detecting the fluid leak, reducing false positives and improving sensitivity of detection of the fluid leak using information from one or more integrated systems, wherein generating the notification comprises generating the notification after reducing the false positives.

3. The method of claim 2, wherein the one or more integrated systems comprise at least one of: an occupancy sensor, a weather report, a water pressure meter, and/or a Heating Ventilating and Air Conditioning (HVAC) system.

4. The method of claim 1, wherein the one or more live video feeds are received concurrently.

5. The method of claim 1, wherein the fluid leak is detected by identifying one or more fluid drips using one or more dense optical flow techniques.

6. The method of claim 1, further comprising generating a confidence score of the fluid leak based on the one or more live video feeds, wherein the confidence score is indicative of an accuracy of detection of the fluid leak.

7. The method of claim 1, wherein the fluid leak is detected using a machine learning model trained using a plurality of video feeds corresponding to one or more types of fluid leaks.

8. The method of claim 1, further comprising displaying the notification to the user using a Graphical User Interface (GUI).

9. The method of claim 8, wherein the GUI includes a user interface element configured for filtering received notifications based on at least one of: a geographic location, a building, and/or a room.

10. The method of claim 1, wherein identifying the motion of the vertically falling fluid comprises measuring a fluid flow velocity.

11. The method of claim 10, further comprising adjusting a range of velocities associated with the fluid leak based on a range of distances from the one or more cameras to the one or more objects that are being monitored.

12. A system for automatically detecting a fluid leak, comprising:
    a hardware processor configured to:
       receive one or more live video feeds from one or more cameras;
       analyze the one or more live video feeds to detect the fluid leak in response to identifying a motion of a vertically falling fluid using a motion algorithm, wherein the motion comprises the motion of one or more objects travelling at a velocity corresponding to falling under effect of gravity forces, repeatedly falling vertically downward in a same region of a field of view of the one or more cameras, and/or falling with a substantially constant frequency; and
       generate a notification to inform a user of the fluid leak, in response to detecting the fluid leak.

13. The system of claim 12, wherein, in response to detecting the fluid leak, the hardware processor is further configured to reduce false positives and improve sensitivity of detection of the fluid leak using information from one or more integrated systems, wherein the hardware processor is further configured to generate the notification after reducing the false positives.

14. The system of claim 13, wherein the one or more integrated systems comprise at least one of: an occupancy sensor, a weather report, a water pressure meter, and/or a Heating Ventilating and Air Conditioning (HVAC) system.

15. The system of claim 12, wherein the one or more live video feeds are received concurrently.

16. The system of claim 12, wherein the fluid leak is detected by identifying one or more fluid drips using one or more dense optical flow techniques.

17. The system of claim 12, wherein the hardware processor is further configured to generate a confidence score of the fluid leak based on the one or more live video feeds, wherein the confidence score is indicative of an accuracy of detection of the fluid leak.

18. The system of claim 12, wherein the fluid leak is detected using a machine learning model trained using a plurality of video feeds corresponding to one or more types of fluid leaks.

19. The system of claim 12, wherein the hardware processor is further configured to display the notification to the user using a Graphical User Interface (GUI).

20. The system of claim 19, wherein the GUI includes a user interface element configured for filtering received notifications based on at least one of: a geographic location, a building, and/or a room.

* * * * *

UNITED STATES PATENT AND TRADEMARK OFFICE
CERTIFICATE OF CORRECTION

| | | |
|---|---|---|
| PATENT NO. | : 12,118,870 B2 | Page 1 of 1 |
| APPLICATION NO. | : 17/570236 | |
| DATED | : October 15, 2024 | |
| INVENTOR(S) | : Ronan Hennessy | |

It is certified that error appears in the above-identified patent and that said Letters Patent is hereby corrected as shown below:

On the Title Page

Item (72) Inventors:
Please delete the third Inventor's city and country and substitute therefor the following:
-- Cork (IE) --.

Signed and Sealed this
Nineteenth Day of August, 2025

Coke Morgan Stewart
*Acting Director of the United States Patent and Trademark Office*